United States Patent
Hayner et al.

(10) Patent No.: US 8,215,177 B2
(45) Date of Patent: Jul. 10, 2012

(54) APPARATUS AND METHODS FOR APPLYING STRESS-INDUCED OFFSET COMPENSATION IN SENSOR DEVICES

(75) Inventors: David A. Hayner, Austin, TX (US); Todd F. Miller, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 319 days.

(21) Appl. No.: 12/619,409

(22) Filed: Nov. 16, 2009

(65) Prior Publication Data

US 2011/0113891 A1    May 19, 2011

(51) Int. Cl.
*G01B 7/16* (2006.01)
(52) U.S. Cl. ............................ 73/765; 73/760
(58) Field of Classification Search .................. 73/760, 73/765–766
See application file for complete search history.

(56) References Cited

U.S. PATENT DOCUMENTS

| | | | |
|---|---|---|---|
| 4,975,643 A * | 12/1990 | Buchwald | 324/207.12 |
| 5,237,516 A * | 8/1993 | Heyman | 702/42 |
| 5,317,147 A * | 5/1994 | Dandliker et al. | 250/227.17 |
| 5,691,595 A | 11/1997 | Tomikawa | |
| 5,801,337 A * | 9/1998 | Peake | 177/1 |
| 6,362,618 B1 | 3/2002 | Motz | |
| 6,453,086 B1 | 9/2002 | Tarazona | |
| 6,789,430 B1 | 9/2004 | Yoneda et al. | |
| 6,806,797 B2 | 10/2004 | Kikushima | |
| 6,845,667 B1 * | 1/2005 | Watson | 73/504.12 |
| 6,912,003 B1 * | 6/2005 | Apel et al. | 348/243 |
| 6,941,823 B1 * | 9/2005 | Lai et al. | 73/862.639 |
| 7,009,905 B2 | 3/2006 | Aipperspach et al. | |
| 7,392,687 B2 | 7/2008 | Huang et al. | |
| 7,400,162 B2 | 7/2008 | Gattiker et al. | |
| 7,410,590 B2 | 8/2008 | Van Schuylenbergh et al. | |
| 7,446,457 B2 | 11/2008 | Ikehashi | |
| 7,968,878 B2 * | 6/2011 | Aggarwal et al. | 257/48 |

* cited by examiner

*Primary Examiner* — Max Noori
(74) *Attorney, Agent, or Firm* — Ingrassia Fisher & Lorenz, PC (57) ABSTRACT

Apparatus and methods for applying stress-induced offset compensation and/or scale factor correction in sensor devices are provided. One sensor device (100, 300, 500, 700) includes an integrated circuit device (110, 310, 510, 710), a transducer (120, 320, 520, 720) coupled to the ASIC device, and a stress sensor (130, 330, 530, 730) coupled to the transducer or the integrated circuit device and configured to measure stress on the sensor device independent of the transducer. Another sensor device (900) includes a transducer, a sensor package (940) enclosing the transducer, and a stress sensor (930) coupled to the sensor device package and configured to measure stress on the sensor device independent of the transducer. A method includes detecting, via a stress sensor, an amount of stress being applied to the sensor device and adjusting, via the stress sensor and independent of the transducer, an output of the sensor device by the detected amount of stress.

17 Claims, 4 Drawing Sheets

FIG. 11

APPARATUS AND METHODS FOR APPLYING STRESS-INDUCED OFFSET COMPENSATION IN SENSOR DEVICES

TECHNICAL FIELD

The disclosed subject matter generally relates to electronic devices, and more particularly relates to apparatus and methods for applying stress-induced offset compensation in sensor devices.

BACKGROUND

When sensor devices (e.g., accelerometers, gyros, compasses or similar devices for measuring the Earth's magnetic field, pressure sensors, torque sensors, or the like) are mounted in physical device packages, the various mounting techniques tend to introduce unknown stresses in the sensor devices. These stresses may induce offsets in the zero input/output generated by the sensor devices, or scale factor changes in the non-zero input/output relationship. Offsets and scale factor stability are important measures of performance in sensor devices. Also, when sensor devices are installed as a portion of a system or device, additional stresses can be introduced to the packages and transmitted to the sensor devices, which further affects the performance of the sensor devices.

Accordingly, it is desirable to provide apparatus and methods for applying stress-induced offset and scale factor compensation in sensor devices. Furthermore, other desirable features and characteristics of the embodiments presented here will become apparent from the subsequent detailed description and the appended claims, taken in conjunction with the accompanying drawings and this background.

BRIEF DESCRIPTION OF THE DRAWINGS

Various embodiments will hereinafter be described in conjunction with the following drawing figures, wherein like numerals denote like elements.

DETAILED DESCRIPTION OF EMBODIMENTS

The following detailed description is merely exemplary in nature and is not intended to limit the scope or the application and uses of the described embodiments. Furthermore, there is no intention to be bound by any theory presented in the preceding background or the following detailed description.

Various embodiments provide a sensor device including a transducer and one or more stress sensors configured to measure the amount of stress on the sensor device, independent of the transducer. In certain embodiments, the stress sensor(s) are configured to apply stress-induced offset compensation for the sensor device. Such offsetting is desirable to improve the zero input/output performance of the sensor device. In certain other embodiments, the stress sensors(s) are configured to provide a scale factor correction. In some embodiments, the stress sensors(s) can be used to provide both offset and scale factor correction.

The subject matter described here is particularly suitable for use with microelectromechanical systems (MEMS) based sensor devices, sensor elements, or sensor architectures, including, without limitation: MEMS based accelerometers, gyroscopes, pressure sensors, compasses, and the like. However, the application of the described subject matter is not limited to MEMS based sensors, and the techniques and technologies presented here could be equivalently deployed in other implementations and deployments. For example, the compensation and correction techniques described here could be equivalently applied to bulk devices (such as a mechanical spinning gyroscope), to the next generation of solid state devices, and/or to other sensor technologies that may be developed in the future.

Figure 1:
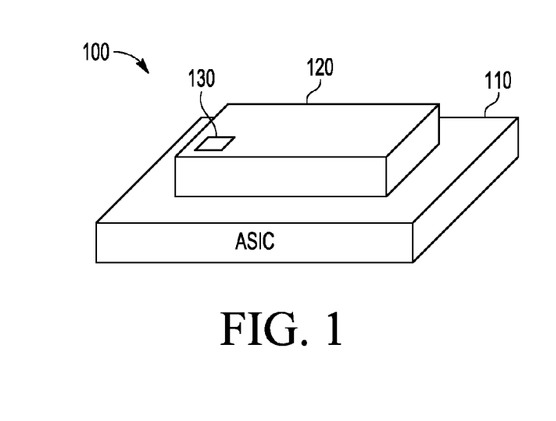
FIG. 1 is a diagram of a sensor device configured in accordance with one embodiment of the invention, which comprises a transducer and a stress sensor coupled to the transducer.

FIG. 1 is a diagram of one embodiment of a sensor device 100 including a stress sensor 130 that can be used to provide stress-induced compensation for sensor device 100. At least in the illustrated embodiment, sensor device 100 comprises an integrated circuit device, which in certain embodiments may be an application-specific integrated circuit (ASIC) device 110, a transducer 120 mounted on ASIC device 110, and a stress sensor 130 coupled (e.g., via glue, epoxy, as part of the sensor fabrication process, etc.) to transducer 120. In practice, stress sensor 130 will typically be fabricated as an integral part of the overall device using, for example, the same device manufacturing processes that are also employed for the fabrication of the device itself (which may be an accelerometer, a gyro, or other sensor device as described herein).

ASIC device 110 may be any integrated circuit device configured for a particular purpose. As such, ASIC device 110 may be any ASIC device known in the art or developed in the future. In certain embodiments, the sensor device 100 could employ a different substrate, circuit board, a processor circuit, or mounting structure (in lieu of the ASIC device 110) coupled to the transducer 120.

Transducer 120 may be any device or system that converts energy or a physical attribute into another type of energy or physical attribute for measurement purposes or data transfer purposes. In this regard, transducer 120 may include or cooperate with elements such as, without limitation: an accelerometer, a switch, an actuator, a gyro, a compass (or similar device for measuring the Earth's magnetic field), a pressure sensor, a torque sensor, or the like.

Stress sensor 130 may be any device and/or system capable of generating a signal, substantially independent of the operation of transducer 120, that is indicative of stress or strain experienced by the transducer 120 (or, indirectly, the ASIC device 110). In turn, the output of the stress sensor 130 can be correlated to stressed-induced offsets and/or scale factor errors of sensor device 100. That is, stress sensor 130 may be any device and/or system capable of detecting the amount of stress that sensor device 100 is experiencing. As described in more detail below, the output of the stress sensor 130 can be processed or otherwise used to derive and generate offset signal correction and/or scale factor correction that adjusts the raw output of the transducer 120 to at least partially compensate for the detected amount of stress. Thus, the raw output of transducer 120 is compensated so that the output signal of sensor device 100 is a signal that is substantially devoid of the effects of any stress being experienced by or exerted on sensor device 100.

In practice, the output of the stress sensor 130 varies with changes in stress imparted to the stress sensor 130. The monitored output of the stress sensor 130 may be, without limitation, a voltage, a current, a resistance, a capacitance, an inductance, or any measurable phenomena that is stress-correlated. In one embodiment, stress sensor 130 comprises a resistor bridge (e.g., a wheatstone bridge or the like), and the output of the stress sensor 130 represents a voltage which is indicative of some measure of the applied stress. In another embodiment, stress sensor 130 is a capacitive sensor (e.g., a capacitor), and the output of the stress sensor 130 represents a measured capacitance. Stress sensor 130, in other embodiments, is a piezoelectric sensor, a resistive sensor, or an optical sensor, where the output of the stress sensor 130 could represent a voltage, a resistance, or the like.

Figure 2:
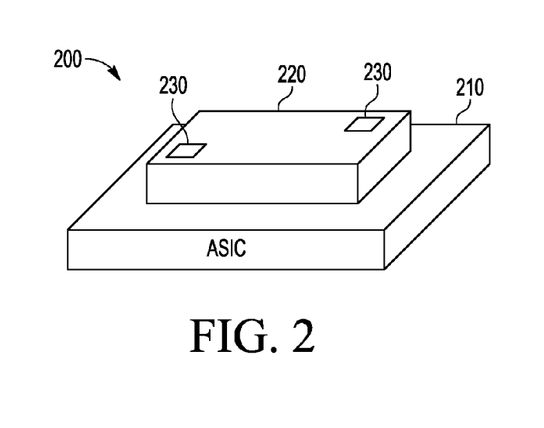
FIG. 2 is a diagram of a sensor device configured in accordance with another embodiment of the invention, which comprises a transducer and a plurality of stress sensors coupled to the transducer.

While FIG. 1 illustrates stress sensor 130 being located in a particular location, the various embodiments of sensor device 100 are not limited to the particular location shown in FIG. 1. That is, various embodiments of sensor device 100 may include stress sensor 130 located anywhere on a particular surface of transducer 120 or on any surface of the device package used for the transducer 120. In some embodiments, the stress sensor 130 could be embedded or integrated into the substrate or other structural element of the transducer 120. Furthermore, various embodiments contemplate that stress sensor 130 may be located anywhere within the device package used for the transducer 120. In addition, while FIG. 1 illustrates a single stress sensor 130 coupled to transducer 120, various embodiments contemplate sensor devices including multiple stress sensors coupled to a transducer for stress-induced offset and/or scale factor correction. For example, FIG. 2 is a diagram of an embodiment of a sensor device 200 including a plurality of stress sensors 230. At least in the illustrated embodiment, sensor device 200 comprises an ASIC device 210 (or any suitable electronic circuit, substrate, board, or mounting structure), a transducer 220 mounted on ASIC device 210, and two or more stress sensors 230 coupled to or incorporated with transducer 220.

Most of the above description of sensor device 100 also applies to sensor device 200. For this embodiment of sensor device 200, however, each of the stress sensors 230 generates an independent output signal that is indicative of the stress experienced by the respective stress sensor 230. In practice, any one or both of these outputs could be used for purposes of offset and/or scale factor adjustment, as described in more detail below.

Figure 3:
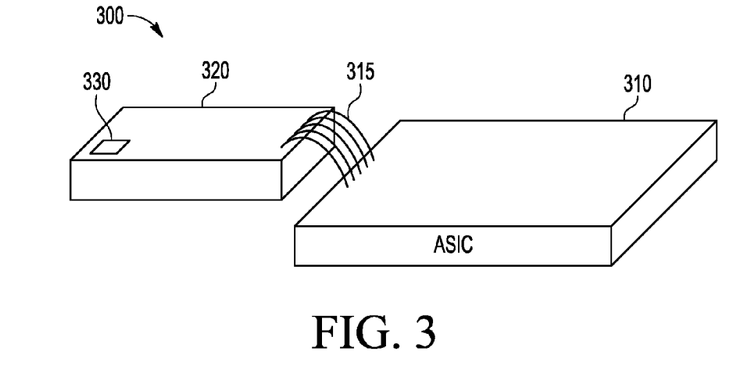
FIG. 3 is a diagram of another sensor device configured in accordance with an embodiment of the invention, which comprises a transducer and a stress sensor coupled to the transducer.

The embodiments depicted in FIGS. 1 and 2 employ transducers 120 and 220 mounted on ASIC devices 110 and 120, respectively. In certain embodiments, however, the transducer (or transducers) could be wire bonded or similarly connected to an ASIC (or other) device. In this regard, FIG. 3 is a diagram of one embodiment of a sensor device 300 including a stress-induced offset and/or scale factor compensation scheme. At least in the illustrated embodiment, sensor device 300 comprises an ASIC device 310, a transducer 320 coupled to ASIC device 310 via wire bonds 315, and a stress sensor 330 coupled to or incorporated with transducer 320. In practice, the stress sensor 330 will typically be fabricated as an integral part of the overall device using, for example, the same device manufacturing processes that are also employed for the fabrication of the device itself.

Figure 4:
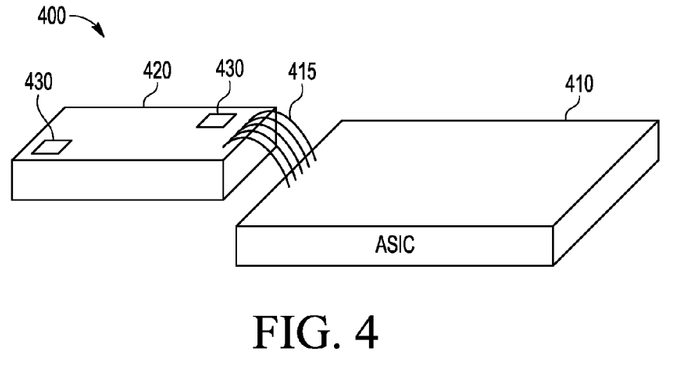
FIG. 4 is a diagram of another sensor device configured in accordance with another embodiment of the invention, which comprises a transducer and a plurality of stress sensors coupled to the transducer.

Most of the above description of sensor device 100 also applies to sensor device 300. For this embodiment of sensor device 300, however, the stress sensor 330 is physically "divorced" and separated from the ASIC device 310. While FIG. 3 illustrates stress sensor 330 being located in a particular location, the various embodiments of sensor device 300 are not limited to the particular location shown in FIG. 3. That is, various embodiments of sensor device 300 may include stress sensor 330 located anywhere on any surface of transducer 320. In some embodiments, the stress sensor 330 could be embedded or integrated into the substrate or other structural element of the transducer 320. Furthermore, various embodiments contemplate that stress sensor 330 may be located anywhere within transducer 320. In addition, while FIG. 3 illustrates a single stress sensor 330 coupled to transducer 320, various embodiments contemplate sensor devices including multiple stress sensors coupled to a transducer for stress-induced offset and/or scale factor compensation. For example, FIG. 4 is a diagram of an embodiment of a sensor device 400 including a plurality of stress sensors 430 located on a transducer 420 that is physically separate from the host ASIC device 410. As mentioned above with reference to FIG. 2, each of the stress sensors 430 generates an independent output signal that is indicative of the stress experienced by the respective stress sensor 430. Consequently, any one or both of these outputs could be used for purposes of offset and/or scale factor adjustment, as described in more detail below.

Figure 5:
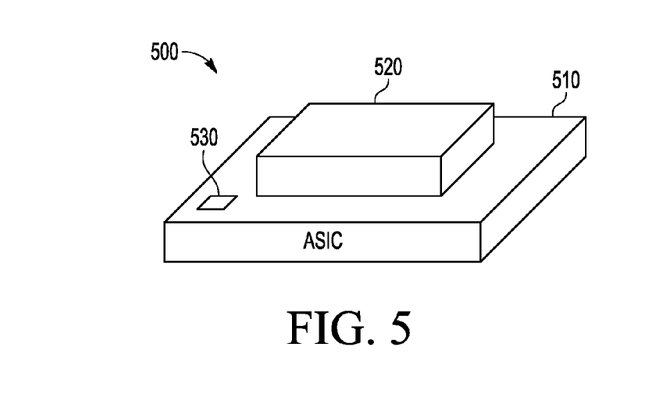
FIG. 5 is a diagram of a sensor device configured in accordance with yet another embodiment of the invention, which comprises a transducer, an integrated circuit device, and a stress sensor coupled to the integrated circuit device.

The embodiments described above with reference to FIGS. 1-4 incorporate stress sensors that are located on the transducer substrate or transducer device. In certain embodiments, however, a stress sensor could be located on another device package, electronic device, circuit board, substrate, mounting structure, or the like. In this regard, FIG. 5 is a diagram of an embodiment of a sensor device 500 including a stress-induced offset compensation scheme. At least in the illustrated embodiment, sensor device 500 comprises an ASIC device 510, a transducer 520 mounted on ASIC device 510, and a stress sensor 530 coupled to or integrated into ASIC device 510. In practice, the stress sensor 530 will typically be fabricated as an integral part of the ASIC device 510 using, for example, the same device manufacturing processes that are also employed for the fabrication of the ASIC device 510 itself.

Most of the above description of sensor device 100 also applies to sensor device 500. For this embodiment of sensor device 500, however, the stress sensor 530 is directly coupled to the ASIC device 510 rather than the transducer 520. Accordingly, the stress sensor 530 will generate a respective stress signal, independent of the operation of transducer 520, that is indicative of stress or strain experienced by the ASIC device 510 (or, indirectly, the transducer 520).

Figure 6:
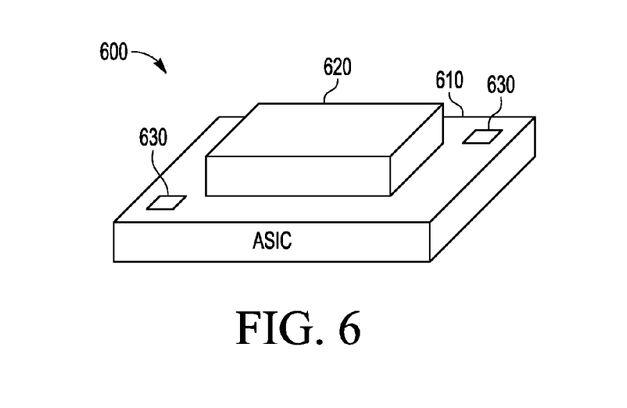
FIG. 6 is a diagram of another sensor device configured in accordance with an embodiment of the invention, which comprises a transducer, an integrated circuit device, and a plurality of stress sensors coupled to the integrated circuit device.

While FIG. 5 illustrates stress sensor 530 being located in a particular location, the various embodiments of sensor device 500 are not limited to the particular location shown in FIG. 5. That is, various embodiments of sensor device 500 may include stress sensor 530 located anywhere on a particular surface of ASIC device 510 or on any surface of the device package used for the ASIC device 510. In some embodiments, the stress sensor 530 could be embedded or integrated into the substrate or other structural element of the ASIC device 510. Furthermore, various embodiments contemplate that stress sensor 530 may be located anywhere within the device package used for the ASIC device 510. In addition, while FIG. 5 illustrates a single stress sensor 530 coupled to ASIC device 510, various embodiments contemplate sensor devices including multiple stress sensors coupled to an ASIC device for stress-induced offset and/or scale factor compensation. For example, FIG. 6 is a diagram of an embodiment of a sensor device 600 including a plurality of stress sensors 630. At least in the illustrated embodiment, sensor device 600 comprises an ASIC device 610 (or any suitable electronic circuit, substrate, board, or mounting structure), a transducer 620 mounted on ASIC device 610, and two or more stress sensors 630 integrated with or coupled to the ASIC device 610. As mentioned previously, stress sensors 630 are typically fabricated as an integral part of the ASIC device 610 using, for example, the same device manufacturing processes that are used to fabricate the ASCI device 610.

Most of the above description of sensor devices 100/500 also applies to sensor device 600. For this embodiment of sensor device 600, however, each of the stress sensors 630 generates an independent output signal that is indicative of the stress experienced by the respective stress sensor 630. In practice, any one or both of these outputs could be used for purposes of offset and/or scale factor adjustment, as described in more detail below.

Figure 7:
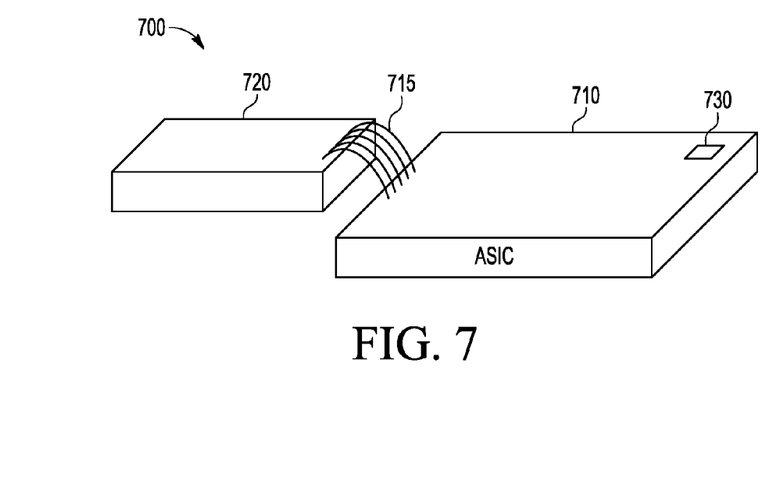
FIG. 7 is a diagram of yet another sensor device configured in accordance with an embodiment of the invention, which comprises a transducer wire bonded to an integrated circuit device, and a stress sensor coupled to the integrated circuit device.

The embodiments depicted in FIGS. 5 and 6 employ transducers 520/620 that are mounted on ASIC devices 510/610, respectively. In certain embodiments, however, the transducer (or transducers) could be wire bonded or similarly connected to an ASIC (or other) device. In this regard, FIG. 7 is a diagram of one embodiment of a sensor device 700 including a stress-induced offset and/or scale factor compensation scheme. At least in the illustrated embodiment, sensor device 700 comprises an ASIC device 710, a transducer 720 coupled to ASIC device 710 via wire bonds 715, and a stress sensor 730 incorporated into or coupled to ASIC device 710.

Most of the above description of sensor devices 100/300/500 also applies to sensor device 700. For this embodiment of sensor device 700, however, the stress sensor 730 is physically "divorced" and separated from the transducer 720. Although the stress detected by the stress sensor 730 represents the stress that is directly associated with the ASIC device 710, the output of the stress sensor 730 can also be correlated to the offset signals and/or scale factor errors generated by the transducer 720 and, therefore, the output of the stress sensor 730 can still be used to effectively correct or compensate for stress-induced offsets and/or scale factor errors of the transducer 720. Thus, the techniques, methodologies, and technology described here can be utilized as long as the output of a stress sensor (or sensors) can be statistically correlated to a stress-induced offset and/or scale factor errors of a transducer device, regardless of the physical location or positioning of the stress sensor (or sensors).

Figure 8:
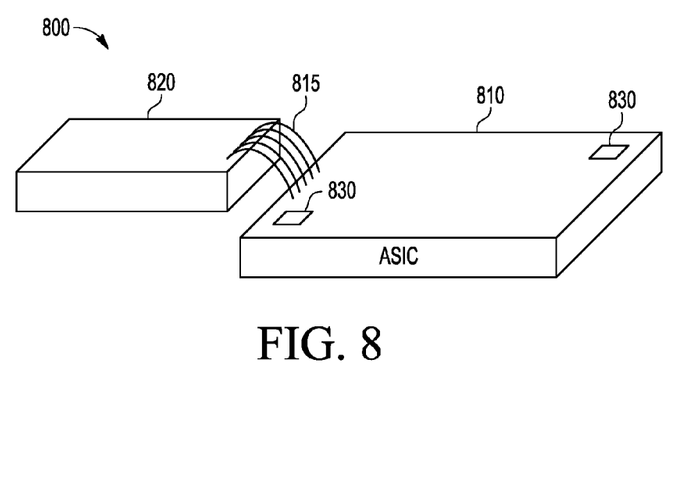
FIG. 8 is a diagram of a sensor device configured in accordance with an embodiment of the invention, which comprises a transducer wire bonded to an integrated circuit device, and a plurality of stress sensors coupled to the integrated circuit device.

While FIG. 7 illustrates stress sensor 730 being located in a particular location, the various embodiments of sensor device 700 are not limited to the particular location shown in FIG. 7. That is, various embodiments of sensor device 700 may include stress sensor 730 located anywhere on a particular surface of ASIC device 710 or on any surface of the device package used for the ASIC device 710. In some embodiments, the stress sensor 730 could be embedded or integrated into the substrate or other structural element of the ASIC device 710. Furthermore, various embodiments contemplate that stress sensor 730 may be located anywhere within the device package used for the ASIC device 710. In addition, while FIG. 7 illustrates a single stress sensor 730 coupled to ASIC device 710, various embodiments contemplate sensor devices including multiple stress sensors coupled to an ASIC device for stress-induced offset and/or scale factor compensation. For example, FIG. 8 is a diagram of an embodiment of a sensor device 800 including a plurality of stress sensors 830 located on an ASIC device 810 that is physically separate from the associated transducer 820. Each of the stress sensors 830 generates an independent output signal that is indicative of the stress experienced by the respective stress sensor 830. Consequently, any one or both of these outputs could be used for purposes of offset adjustment, as described in more detail below.

While FIGS. 1-4 each illustrate stress sensors 130, 230, 330, and 430 coupled to transducers 120, 220, 320, and 420, respectively, and FIGS. 5-8 each illustrate stress sensors 530, 630, 730, and 830 coupled to ASIC devices 510, 610, 710, and 810, respectively, various other sensor device embodiments include one or more stress sensors coupled to the device package of a sensor device for stress-induced offset and/or scale factor compensation.

Figure 9:
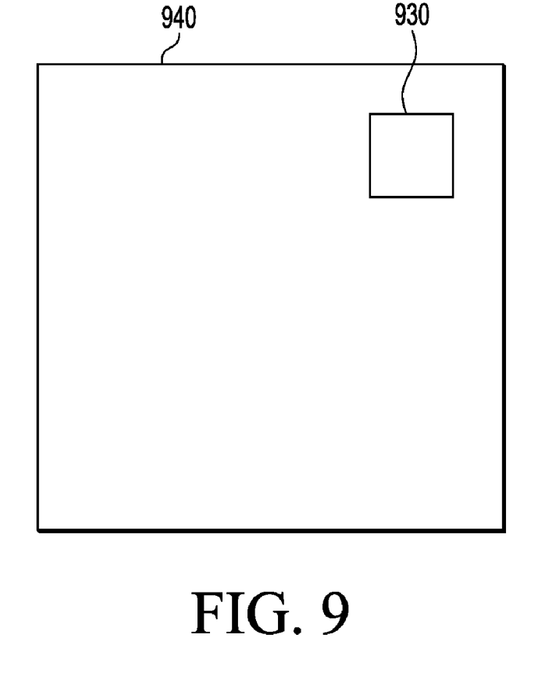
FIG. 9 is a diagram of another sensor device configured in accordance with another embodiment of the invention, which comprises a sensor package enclosing a transducer, and a stress sensor coupled to the sensor package.

FIG. 9 is a diagram of one embodiment of a sensor device 900 including a stress sensor 930 to provide stress-induced compensation for sensor device 900. At least in the illustrated embodiment, sensor device 900 comprises a sensor package 940 enclosing an ASIC device (not shown) similar to ASIC devices 110, 210, 310, 410, 510, 610, 710, and 810, a transducer (not shown) similar to transducers 120, 220, 320, 420, 520, 620, 720, and 820 mounted on or coupled to the ASIC device, and a stress sensor 930 coupled to or integrated into the sensor package 940, which may be any device package known in the art or developed in the future. In practice, the stress sensor 930 could be affixed to the sensor package 940 using, for example, an adhesive or any suitable attachment mechanism, device, or process, or the stress sensor 930 could be incorporated into or integrated with the sensor package 940 itself.

Figure 10:
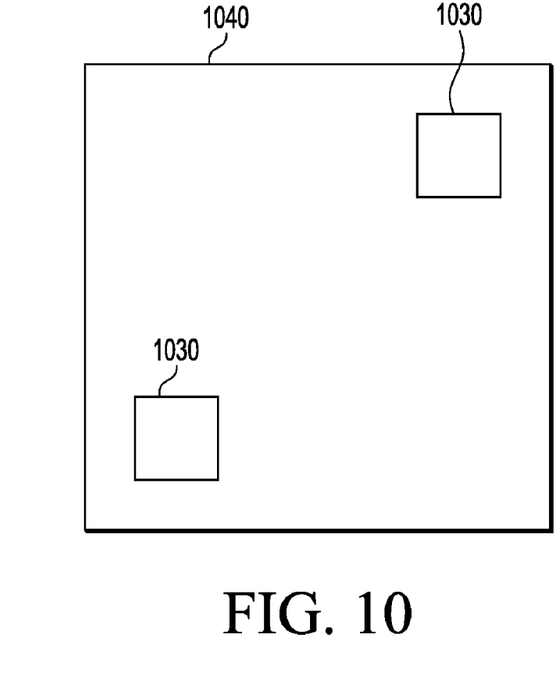
FIG. 10 is a diagram of yet another sensor device configured in accordance with an embodiment of the invention, which comprises a sensor package enclosing a transducer, and a plurality of stress sensors coupled to the sensor package.

While FIG. 9 illustrates stress sensor 930 being located in a particular location, the various embodiments of sensor device 900 are not limited to the particular location shown in FIG. 9. That is, various embodiments of sensor device 900 may include stress sensor 930 located anywhere on sensor package 940 or on any surface of sensor package 940. Furthermore, various embodiments contemplate that stress sensor 930 may be located anywhere within sensor package 940. In addition, while FIG. 9 illustrates a single stress sensor 930 coupled to sensor package 940, various embodiments contemplate sensor devices including multiple stress sensors coupled to a sensor package for stress-induced offset and/or scale factor compensation. In this regard, FIG. 10 is a diagram of an embodiment of a sensor device 1000 including a plurality of stress sensors 1030 to provide stress-induced compensation for sensor device 1000. Each of the stress sensors 1030 generates an independent output signal that is indicative of the stress experienced by the respective stress sensor 1030. Consequently, any one or both of these outputs could be used for purposes of offset adjustment and/or scale factor corrections, as described in more detail below.

It should be appreciated that an embodiment of a sensor device may utilize any number of stress sensors located at a variety of positions in or on the sensor device (as described in more detail above). In this regard, a sensor device could include one or more stress sensors integrated with or coupled to a transducer, an ASIC device, a transducer device package, an ASIC device package, an overall sensor device package, in any desired combination. For example, an embodiment of a sensor device could include at least one stress sensor integrated with its transducer and at least one stress sensor integrated with its ASIC device. Another embodiment of a sensor device could have multiple stress sensors incorporated into its transducer, and one stress sensor incorporated into its ASIC device. As another example, a sensor device could have at least one stress sensor for its transducer, at least one stress sensor for its ASIC device, and at least one stress sensor for its device package. These examples are merely illustrative of the many different possible implementations and deployments that could be fabricated.

Figure 11:
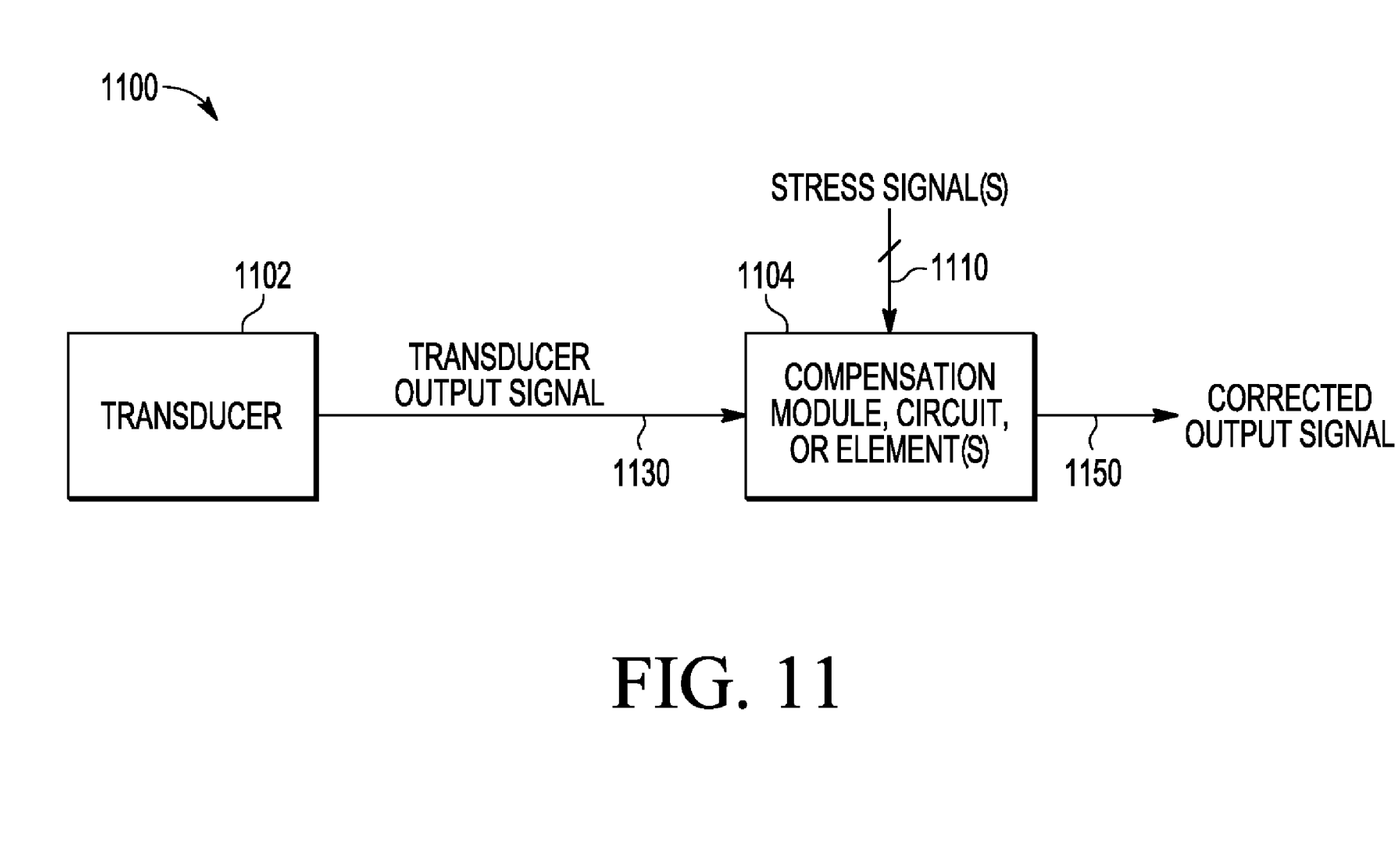
FIG. 11 is a schematic diagram that illustrates the operation of the sensor devices of FIGS. 1-10.

FIG. 11 is a diagram illustrating the operation of the sensor devices of FIGS. 1-10. As explained previously, one or more stress sensors are used to detect stress being experienced by the sensor device. In certain embodiments, the raw stress signals are represented by analog, continuous time signals. The individual (or combined) stress signals are indicative of an amount of stress on the host sensor device. FIG. 11 depicts an exemplary embodiment of a sensor device 1100 having a transducer 1102 and a compensation module 1104, which may be realized as one or more circuits, elements, electronic components, integrated circuits, processor devices, digital logic devices, or the like. In certain embodiments, the compensation module 1104 could be fabricated as part of an ASIC device of the sensor device 1100 (although not shown in FIG. 11, such ASIC devices have been described in detail above). Indeed, the compensation module 1104 could be implemented with a processor (e.g., a microprocessor unit) of an integrated circuit device used by the sensor device 1100. Alternatively, the compensation could be performed in the system that collects the transducer output signal 1130 and the stress signal(s) 1110.

The compensation module 1104 is suitably configured to receive or otherwise obtain an output signal 1130 from the transducer 1102, along with the stress signal(s) 1110 from the stress sensor(s) of the sensor device 1100 (although not shown in FIG. 11, stress sensors have been described in detail above). The stress signal(s) 1110 from the stress sensor(s) are used to calculate and generate a corrected output signal 1150 from the transducer output signal 1130. This corrected output signal 1150 may be a stress-induced offset corrected signal, a stress-induced scale factor corrected signal, or a signal that is both offset-corrected and scale factor corrected. Thus, the compensation module 1104 at least partially compensates for the effects of stress by adjusting the output signal 1130 from the transducer 1102. In this regard, the corrected output signal 1150 is derived from, influenced by, or otherwise generated from the raw stress signal or signals 1110 that are obtained from the stress sensor(s). For this embodiment, the corrected output signal 1150 is substantially devoid of the effects of the stress being experienced by the sensor device 1100. Here, it should be appreciated that the operation of the compensation module 1104 and the generation of the stress signal(s) 1110 are independent of the operation of the transducer 1102, such that the corrected output signal 1150 accurately compensates for stress-induced offset of the transducer 1102.

The corrected output signal 1150 can be generated by the compensation module 1104 using any suitable technique or technology. In practice, each of the stress signal(s) will typically originate as an analog, continuous time voltage or current. The compensation module 1104 can use, process, or otherwise respond to these stress signal(s) in an appropriate manner, depending upon the particular embodiment. For example, if a stress signal 1110 is an analog voltage signal that can be correlated to offset in the transducer output signal 1130, then the compensation circuit could generate an offset voltage, signal, metric, or other quantity as a function of the stress signal 1110. One simple function could be, for example, a multiplier (K) that is applied to the stress signal 1110. For such a case, the compensation module 1104 could employ a resistor divider network or an operational amplifier having a gain of K. The result of this multiplication may be considered to be an offset signal that can be subtracted from the transducer output signal 1130 to obtain an offset-corrected output signal 1150.

As another example, assume that the stress signal 1110 is a continuous time analog current. The compensation module could process this analog current signal (using, for example, appropriate analog techniques or methodologies) to correlate the analog current signal to a scale factor error in the transducer output signal 1130. Then, the correlated current signal could be converted into a digital signal (having a desired bit resolution, such as eight bits, ten bits, etc.) at a specific sampling rate. This digitized signal can then be processed in the digital domain as needed to correct for the scale factor error. In this regard, the compensation module 1104 could employ dedicated, custom logic, a microprocessor, or some combination thereof. With such an implementation, the transducer output signal 1130 could be adjusted in response to an instruction in a microcontroller, or it could be adjusted using dedicated logic. Alternately, a digital correction signal could be converted back to the analog domain so that the transducer output signal 1130 can be adjusted (using, for example, a multiplying digital to analog converter or a multiplier) in the analog domain.

The specific manner in which the compensation module 1104 generates the corrected output signal 1150 from the stress signal(s) and the transducer output signal 1130 may vary from one sensor device to another. For instance, the straightforward example described above could use a summer element to subtract an offset signal (which is generated from the stress signal or signals) from the original transducer output signal 1130. However, other implementations could utilize a more complex technique for adjusting the transducer output signal 1130. In other embodiments, an offset signal and a scale factor correction term could be calculated as a function of both the stress signals 1110 and the transducer output signal 1130 (rather than a function of only the stress signals 1110). Moreover, in some embodiments, a sensor device could be suitably configured to support different techniques and methodologies (which may be user-selectable) for generating the corrected output signal 1150. In this regard, a stress signal (or a signal, metric, or quantity based on a stress signal) could be provided as an output that the user of the sensor device could optionally select to use in various ways.

In practice, the generation of the corrected output signal 1150 is calibrated in accordance with the particular sensor device such that the desired compensation and correction is achieved. Calibration could be generally accomplished as part of a manufacturing characterization process. During this process, empirical data is collected from a large sample of devices mounted in a wide variety of ways using different techniques. The collected data can then be used to derive the relationship(s) between the stress measures and the transducer offsets and/or scale factor errors. These relationships can then be programmed into the sensor device or otherwise used to configure the compensation module 1104. This configuration and programming may be as simple as setting some resistance values in a resistor divider network (mentioned above) or updating some coefficients in a software/firmware routine that runs in the sensor device, or in the user's device. Calibration may also be realized by individual testing of each sensor device and providing the calibration information to a "programming" function on a device-by-device basis.

In various embodiments, the stress to offset or stress to scale factor calculations may include the use of temperature and/or other measures to adjust, modify, or compensate the transducer output signal 1130. For example, the corrected output signal 1150 may be a function of signal(s) 1110, a measured or detected temperature, the transducer output signal 1130, and/or other measured or detected quantities, parameters, conditions, or states.

In summary, systems, devices, and methods configured in accordance with exemplary embodiments relate to:

A sensor device comprising an integrated circuit device, a transducer coupled to the integrated circuit device and configured to generate a transducer output, a first stress sensor coupled to the transducer or the integrated circuit device and configured to generate a stress signal that is indicative of an amount of stress on the sensor device independent of the transducer, and a compensation circuit coupled to the transducer and to the first stress sensor. The compensation circuit is configured to receive the transducer output, and to offset the transducer output in response to the stress signal. The sensor device may further comprise a second stress sensor coupled to the transducer or the integrated circuit device, the second stress sensor configured to generate a second stress signal that is indicative of stress on the sensor device independent of the transducer, wherein the compensation circuit is also coupled to the second stress sensor, and the compensation circuit is configured to offset the transducer output in response to the stress signal and in response to the second stress signal. In some embodiments, the first stress sensor and the second stress sensor are each one of a resistor bridge, a capacitive sensor, an optical sensor, a piezoelectric sensor, and a resistive sensor. In certain embodiments, the transducer is one of an accelerometer, a gyro, a compass, a pressure sensor, and a torque sensor. In one embodiment, the first stress sensor is a resistor bridge and the transducer is an accelerometer. The sensor device may further comprise a plurality of wire bonds coupling the transducer to the integrated circuit device.

A microelectromechanical sensor device comprising a transducer configured to generate a transducer output signal, a sensor package enclosing the transducer, and a first stress sensor coupled to the sensor package and configured to detect an amount of stress on the sensor device independent of the transducer, wherein the detected amount of stress is used to scale the output of the transducer. The sensor device may further comprise a second stress sensor coupled to the sensor package, the second stress sensor configured to detect a second amount of stress on the sensor device independent of the transducer, wherein the detected second amount of stress is used to scale the output of the transducer. The sensor device may further comprise a compensation circuit coupled to the first stress sensor and to the transducer, the compensation circuit being configured to generate a corrected output signal from the transducer output signal and the detected amount of stress. The compensation circuit may be configured to generate the corrected output signal by adjusting the transducer output signal by an amount that is influenced by the detected amount of stress. In certain embodiments, the transducer is one of an accelerometer, a gyro, a compass, a pressure sensor, and a torque sensor. In some embodiments, the first stress sensor is one of a resistor bridge, a capacitive sensor, an optical sensor, a piezoelectric sensor, and a resistive sensor.

A method for applying stress-induced compensation in a sensor device including a transducer and one or more stress sensors, the method comprising detecting, via a first stress sensor, a first measure of stress being experienced by the sensor device, the first measure of stress being indicated by a first stress signal, and adjusting an output of the transducer in response to the first stress signal, wherein the offsetting is independent of operation of the transducer. The method may further comprise calculating an amount of offset to at least partially compensate for the detected first measure of stress, wherein adjusting comprises adjusting the output of the transducer with the calculated amount of offset to generate a corrected output for the sensor device that compensates for the detected first measure of stress. The method may further comprise detecting, via a second stress sensor, a second measure of stress being experienced by the sensor device, the second measure of stress being indicated by a second stress signal, wherein adjusting the output of the transducer is influenced by both the first stress signal and the second stress signal, and independent of operation of the transducer. The method may further comprise calculating an amount of offset based upon the detected first measure of stress and the detected second measure of stress, wherein adjusting the output of the transducer is influenced by the amount of offset.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A sensor device, comprising:
   an integrated circuit device;
   a transducer coupled to the integrated circuit device and configured to generate a transducer output;
   a first stress sensor coupled to the transducer or the integrated circuit device and configured to detect a first measure of stress being experienced by the sensor device, the first measure of stress being indicated by a first stress signal; and
   a compensation circuit coupled to the transducer and to the first stress sensor, the compensation circuit being configured to receive the transducer output and the first stress signal, calculate an amount of offset to at least partially compensate for the detected first measure of stress, and to adjust the transducer output in response to the first stress signal, wherein the adjusting is independent of operation of the transducer, and wherein the adjusting comprises adjusting the transducer output with the calculated amount of offset to generate a corrected output for the sensor device that compensates for the detected first measure of stress.

2. The sensor device of claim 1, further comprising a second stress sensor coupled to the transducer or the integrated circuit device, the second stress sensor configured to generate a second stress signal that is indicative of stress on the sensor device independent of the transducer, wherein the compensation circuit is also coupled to the second stress sensor, and the compensation circuit is configured to offset the transducer output in response to the first stress signal and in response to the second stress signal.

3. The sensor device of claim 1, wherein the compensation circuit is implemented in the integrated circuit device.

4. The sensor device of claim 3, wherein the compensation circuit is implemented with a processor of the integrated circuit device.

5. The sensor device of claim 1, wherein the first stress sensor is one of a resistor bridge, a capacitive sensor, an optical sensor, a piezoelectric sensor, and a resistive sensor.

6. The sensor device of claim 5, wherein the transducer is one of an accelerometer, a gyro, a compass, a pressure sensor, and a torque sensor.

7. The sensor device of claim 1, wherein the transducer is one of an accelerometer, a gyro, a compass, a pressure sensor, and a torque sensor.

8. The sensor device of claim 1, wherein the first stress sensor is a resistor bridge and the transducer is an accelerometer.

9. The sensor device of claim 1, further comprising a plurality of wire bonds coupling the transducer to the integrated circuit device.

10. A microelectromechanical sensor device, comprising:
a transducer configured to generate a transducer output signal;
a sensor device package enclosing the transducer;
a first stress sensor coupled to the sensor device package and configured to detect a first measure of stress being experienced by the sensor device, the first measure of stress being indicated by a first stress signal; and
a compensation circuit coupled to the transducer and to the first stress sensor, the compensation circuit being configured to receive the transducer output signal and the first stress signal, calculate an amount of offset to at least partially compensate for the detected first measure of stress, and adjust the transducer output signal in response to the first stress signal, wherein the adjusting is independent of operation of the transducer, and wherein the adjusting comprises adjusting the transducer output signal with the calculated amount of offset to generate a corrected output for the sensor device that compensates for the detected first measure of stress.

11. The microelectromechanical sensor device of claim 10, further comprising a second stress sensor coupled to the sensor device package, the second stress sensor configured to detect a second amount of stress on the sensor device independent of the transducer, wherein the detected second amount of stress is used to scale the output of the transducer.

12. The sensor device of claim 10, wherein the transducer is one of an accelerometer, a gyro, a compass, a pressure sensor, and a torque sensor.

13. The microelectromechanical sensor device of claim 10, wherein the first stress sensor is one of a resistor bridge, a capacitive sensor, an optical sensor, a piezoelectric sensor, and a resistive sensor.

14. The microelectromechanical sensor device of claim 10, wherein the first stress sensor is a resistor bridge and the transducer is an accelerometer.

15. A method for applying stress-induced compensation in a sensor device including a transducer and one or more stress sensors, the method comprising:
detecting, via a first stress sensor, a first measure of stress being experienced by the sensor device, the first measure of stress being indicated by a first stress signal;
calculating an amount of offset to at least partially compensate for the detected first measure of stress; and
adjusting an output of the transducer in response to the first stress signal, wherein the adjusting is independent of operation of the transducer, and wherein the adjusting comprises adjusting the output of the transducer with the calculated amount of offset to generate a corrected output for the sensor device that compensates for the detected first measure of stress.

16. A method for applying stress-induced compensation in a sensor device including a transducer and one or more stress sensors, the method comprising:
detecting, via a first stress sensor, a first measure of stress being experienced by the sensor device, the first measure of stress being indicated by a first stress signal;
detecting, via a second stress sensor, a second measure of stress being experienced by the sensor device, the second measure of stress being indicated by a second stress signal; and
adjusting an output of the transducer in response to both the first stress signal and the second stress signal, wherein the adjusting is independent of operation of the transducer.

17. The method of claim 16, further comprising calculating an amount of offset based upon the detected first measure of stress and the detected second measure of stress, wherein adjusting the output of the transducer is influenced by the amount of offset.

* * * * *